United States Patent [19]

Schoenwald et al.

[11] Patent Number: 4,964,785
[45] Date of Patent: Oct. 23, 1990

[54] PUMP ASSEMBLY

[75] Inventors: Siegfried Schoenwald; Eberhard Breyer, both of Bad Neustadt; Hans-Georg Trojahn, Saal, all of Fed. Rep. of Germany

[73] Assignee: Siemens Aktiengesellschaft, Berlin & Munich, Fed. Rep. of Germany

[21] Appl. No.: 429,828

[22] Filed: Oct. 31, 1989

[30] Foreign Application Priority Data

Nov. 7, 1988 [EP] European Pat. Off. ........ 88118521.9

[51] Int. Cl.⁵ ............................................. F04B 35/04
[52] U.S. Cl. ................................. 417/360; 417/423.15
[58] Field of Search .................... 417/359, 360, 423.15

[56] References Cited

U.S. PATENT DOCUMENTS 4,722,661  2/1988  Mizuno ........................... 417/360 X Primary Examiner—Robert G. Nilson
Attorney, Agent, or Firm—Kenyon & Kenyon

[57] ABSTRACT

A pump assembly having a mounting arrangement which minimizes or eliminates bending stresses which may cause grinding between the pump rotor and its housing includes laterally spaced legs extending from the pump housing at a location adjacent to the end opposite the end coupled to the drive motor. The undersurface of each leg includes a surface upon which the assembly may pivot. Furthermore, the motor is fastened to a support plate at a single point, while another mechanism in combination with that connection prevents relative rotation between the motor and the support plate.

12 Claims, 2 Drawing Sheets

PUMP ASSEMBLY

BACKGROUND OF THE INVENTION

The present invention relates to a pump assembly generally, and more particularly to an improved mounting arrangement therefor.

Pump assemblies typically comprise a pump coupled to a motor and a mounting arrangement for mounting the assembly at the installation site. Such a pump assembly is disclosed in the journal "Siemens Energietechnik 7 (1985), Special Issue Pumps and Compressors", pages 6 to 8. In this assembly, the motor supports the pump via a support flange which is provided betWeen the pump housing and the housing of the drive motor. Furthermore, only four legs with corresponding mounting holes are provided at the motor housing for securing the assembly to the mounting surface at the installation site. Thus, when the pump housing is subjected to external forces, such as the weight of inlet and outlet pipes which are connected to the pump, bending stresses of large magnitude may occur. These stresses can force the pump rotor against its housing due to the narrow operating gaps therebetween. As a result, the rotor grinds against the housing.

Therefore, there is a need to provide a pump assembly with a mounting arrangement that avoids the occurrence of such bending stresses which cause grinding of the rotor.

SUMMARY OF THE INVENTION

The present invention is directed to a pump assembly having a mounting arrangement that avoids the problems and disadvantages of the prior art. The invention accomplishes this goal by providing the pump, which includes a housing having a first end coupled to the motor and a second end covered by a cover element, with laterally spaced legs extending from the pump housing at a location adjacent to the second end. Each leg includes a mounting hole for securing the pump assembly to a mounting surface. The undersurface of each leg includes a linear support surface, formed by recessing the surfaces adjacent thereto which extend toward the outer sides of the leg. A base plate also is provided to further secure the pump assembly to the mounting surface. Because the base plate only is fastened to the motor at a single connection point, a further mechanism is provided to prevent relative rotation therebetween.

Due to the arrangement of the legs beneath the pump housing, the resultant lever arm for the bending forces is substantially reduced, thereby substantially reducing the bending stresses and preventing grinding between the pump rotor and pump housing. Furthermore, the linear support surface of the pump legs minimizes bending stresses that may otherwise result from securing the pump assembly to a non-planar surface. More specifically, if the pump assembly is mounted on a non-planar surface, the complete assembly may pivot about the linear support surface of each leg extending from the pump housing. Thus, the motor and pump may be properly supported on a non-planar surface without developing any appreciable bending stresses between the pump and motor housing. Furthermore, the single connection between the motor and the base plate, and the laterally spaced linear support surfaces underneath the pump housing, provide a true three-point support for the pump assembly that ensures stability without developing bending stresses between the two housings when mounted on a non-planar surface.

According to another aspect of the invention, the legs of the pump housing may be made by casting. In such case the casting seam which results on the undersurface of each leg may be left to be used as the linear support surface. The linear support thus is obtained without additional cost. Furthermore, since the leg surfaces have a slight rise on both sides of the cast seam for reasons of removal from the mold, a perfect linear support surface is assured by the seam.

A further aspect of the present invention is that relative rotation between the motor housing and the base plate is prevented by a finger-like projection, which extends from the base plate, and a pair of cooling fins, which extend from the motor housing, wherein the finger-like projection extends between the cooling fins at a location axially spaced from the connection between the base plate and motor housing.

DETAILED DESCRIPTION

Figure 1:
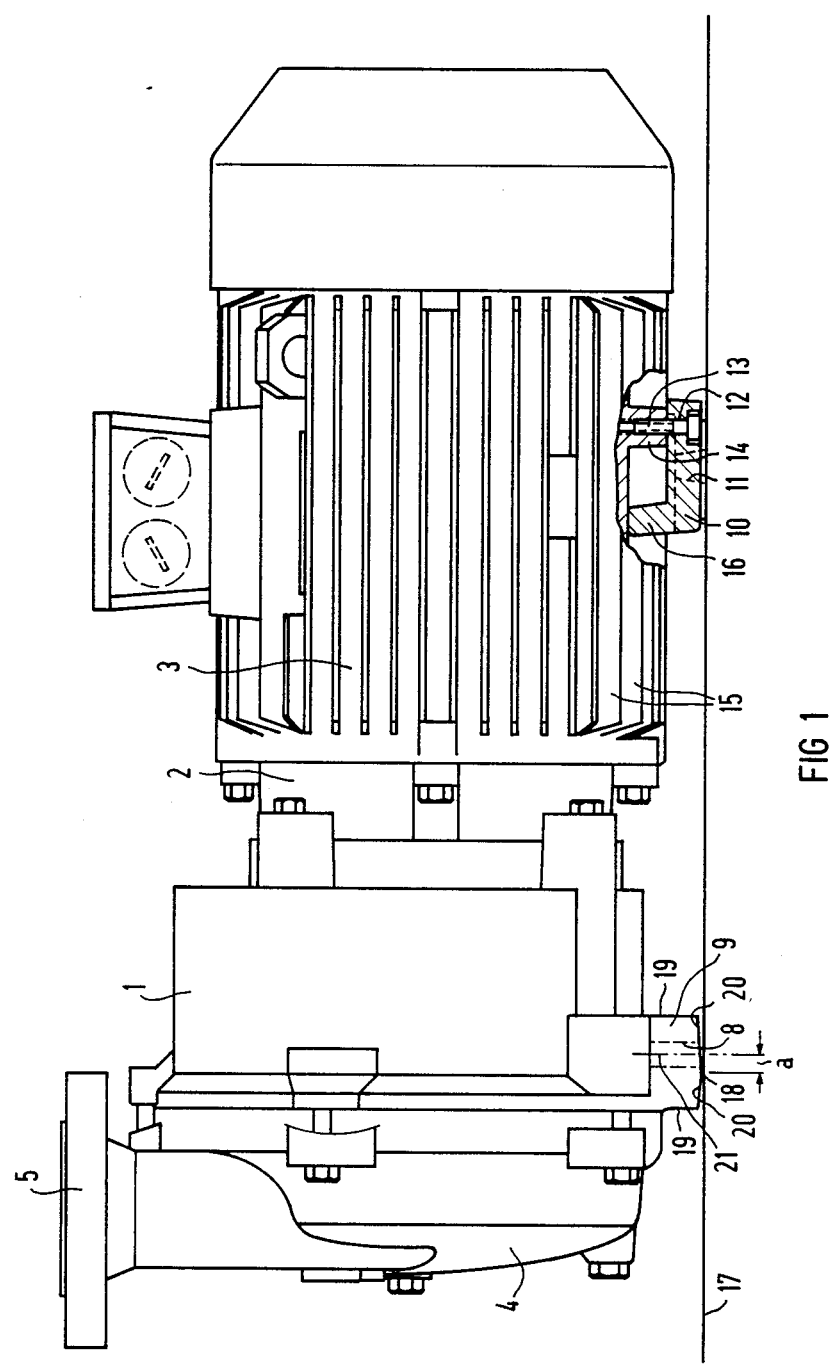
FIG. 1 is a side elevational view of a pump assembly in accordance with the principles of the present invention showing the motor mounting mechanism in cross-section.

Referring to the drawings in detail wherein like numerals indicate like elements a motor-driven pump assembly is shown. With reference to FIG. 1, pump housing 1 of the liquid-ring pump is rigidly coupled to motor housing 3 of the drive motor via coupling member 2. On the side opposite the drive motor, pump housing 1 is sealed by housing cover 4 which includes suction and pressure conduit-like connections 5 and 6 formed thereon. These connections link the pump with inlet and outlet lines which may be in the form of piping. Housing 1 also is provided with laterally spaced legs 9 having mounting holes 8.

Figure 2:
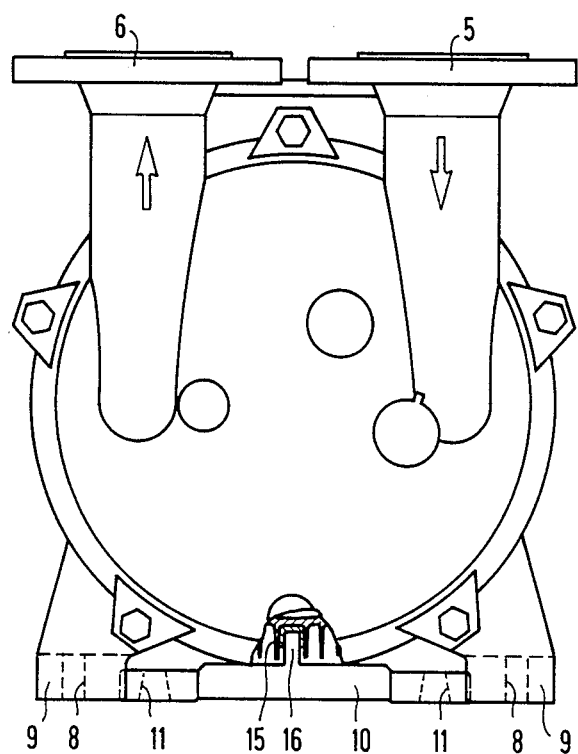
FIG. 2 is an end view of the pump assembly of FIG. 1 illustrating a rotation preventing coupling between the motor and its base plate in partial cross-section.
Figure 3:
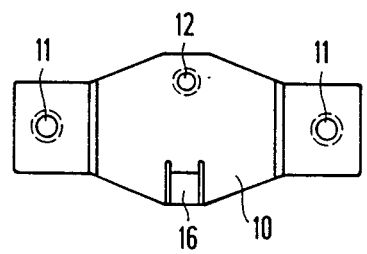
FIG. 3 is a top plan view of the motor base plate.

Base or support plate 10 is arranged below motor housing 3 for supporting the motor. As can be understood, while viewing FIGS. 2 and 3, the motor is centered on base or support plate 10 so that the center axis of the motor is vertically aligned above the symmetrical axis of base plate 10. More specifically, base plate 10 includes two laterally spaced mounting holes 11 symmetrically arranged about third mounting hole 12 which is laterally centered in base plate 10. Screw 13 passes through third mounting hole 12 and into a bore in motor extension or projection 14 to fasten base plate 10 to the motor. Motor housing 3 and base plate 10 are protected against relative rotation by projection or finger 16. Projection 16 is formed on base plate 10 and extends between a pair of adjacent cooling fins 15 that extend radially from motor housing 3 to prevent the motor from rotating about the center line of mounting hole 12, and thus about the base plate.

Returning to FIG. 1, the under surface of each leg 9 facing mounting surface 17 is configured to provide a linear contact surface upon which the pump may pivot. To this end, the under surface of each leg 9 includes linear support surface 18 which extends in a direction transverse to the axial direction of the pump and which extends downwardly further than surfaces 20 adjacent thereto, i.e., surfaces 20 are recessed. Linear support surface 18, for example, may be formed by machining legs 9 in the region of surfaces 20. However, if legs 9 are made by casting, the cast seam, which is naturally formed on the undersurface of each leg since surfaces 20 are made slightly rising with respect to outer sides 19 to permit ease of mold removal, may be used as the linear support surface. Thus, manufacturing costs related to the removal of the casting seam while finishing or cleaning the casting are eliminated and linear support 18 is obtained without any additional manufacturing costs.

Linear support surface 18 may extend along a line passing through center lines 21 of mounting holes 8 provided in legs 9. However, it may be more advantageous to offset linear support surface 18 a distance approximately one-quarter of a leg width away from the line passing through the centers of mounting holes 8 toward housing cover 4. This distance is designated by the letter "a" in FIG. 1. Thus, when the pump assembly is mounted to surface 17 at the installation site, motor housing 3 is placed under tension due to the offset position of support surface 18. That tension provides a tight connection between motor housing 3 and base plate 10, thereby eliminating vibration noise.

The position of legs 9 as well as the above described configuration of their undersurfaces, combined with the structural relationship between base plate 10 and motor housing 3 make it possible to install the pump assembly on non-planar mounting surfaces without developing undesirable bending stresses that may cause "grinding" between the pump rotor and pump housing.

What is claimed is:

1. A pump assembly comprising:
    a motor including a motor housing and a projection extending radially from the underside thereof;
    a pump including a housing having a first end coupled to said motor and a second end covered by a cover member;
    two laterally spaced legs extending from said pump housing at a location adjacent to said second end, each leg having a mounting hole formed therethrough for securing the pump assembly to a mounting surface and an undersurface including a linear support surface, said linear support surface being in the vicinity of the center of said mounting hole and formed by recessed surfaces adjacent thereto which extend axially toward the outer sides of the leg;
    a base plate for further securing said pump assembly to said mounting surface, said base plate only being fastened to said pump assembly at said motor projection; and
    means for preventing relative rotation between said motor and said base plate.

2. The pump assembly of claim 1 wherein a casting seam forms each linear support surface.

3. The pump assembly of claim 2 wherein said rotation prevention means includes a pair of cooling fins extending radially from said motor housing and a finger-like projection extending from said base plate, wherein said finger-like projection extends between said cooling fins at a location axially spaced from said motor projection.

4. The pump assembly of claim 1 wherein said rotation prevention means includes a pair of cooling fins extending radially from said motor housing and a finger-like projection extending from said base plate, wherein said finger-like projection extends between said cooling fins at a location axially spaced from said motor projection.

5. The pump assembly of claim 1 wherein said linear support surfaces extend along a line that passes through the centers of said mounting holes.

6. The pump assembly of claim 5 wherein a casting seam forms each linear support surface.

7. The pump assembly of claim 6 wherein said rotation prevention means includes a pair of cooling fins extending radially from said motor housing and a finger-like projection extending from said base plate, wherein said finger-like projection extends between said cooling fins at a location axially spaced from said motor projection.

8. The pump assembly of claim 5 wherein said rotation prevention means includes a pair of cooling fins extending radially from said motor housing and a finger-like projection extending from said base plate, wherein said finger-like projection extends between said cooling fins at a location axially spaced from said motor projection.

9. The pump assembly of claim 1 wherein said linear support surfaces extend along a line which is spaced from said mounting hole centers in a direction toward said cover member.

10. The pump assembly of claim 9 wherein a casting seam forms each linear support surface.

11. The pump assembly of claim 10 wherein said rotation prevention means includes a pair of cooling fins extending radially from said motor housing and a finger-like projection extending from said base plate, wherein said finger-like projection extends between said cooling fins at a location axially spaced from said motor projection.

12. The pump assembly of claim 9 wherein said rotation prevention means includes a pair of cooling fins extending radially from said motor housing and a finger-like projection extending from said base plate, wherein said finger-like projection extends between said cooling fins at a location axially spaced from said motor projection.

* * * * *